(12) United States Patent
Hemmi et al.

(10) Patent No.: US 7,832,934 B2
(45) Date of Patent: Nov. 16, 2010

(54) THRUST BEARING DEVICE

(75) Inventors: Makoto Hemmi, Hitachinaka (JP);
Akitomi Semba, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 740 days.

(21) Appl. No.: 11/836,169

(22) Filed: Aug. 9, 2007

(65) Prior Publication Data
US 2008/0085068 A1    Apr. 10, 2008

(30) Foreign Application Priority Data
Oct. 5, 2006    (JP)    ................. 2006-274241

(51) Int. Cl.
*F16C 32/06*    (2006.01)
*F16C 1/24*    (2006.01)

(52) U.S. Cl. .................. 384/121; 384/368

(58) Field of Classification Search ............ 384/100, 384/107, 112, 116, 121, 123, 368, 420
See application file for complete search history.

(56) References Cited
U.S. PATENT DOCUMENTS 4,383,771 A * 5/1983 Freytag et al. ............ 384/121
4,863,291 A * 9/1989 Heshmat et al. ........... 384/305
6,481,895 B2 * 11/2002 Yang et al. ................ 384/294
6,913,268 B2 * 7/2005 Bohler ...................... 279/4.1
7,470,064 B2 * 12/2008 Link et al. ................. 384/121

FOREIGN PATENT DOCUMENTS

JP    09-048324    2/1997
JP    2006-274244    2/1997

OTHER PUBLICATIONS

Japanese Society of Tribologists, Toraiboroji hando bukku (tribology handbook), Yokendo, 2001, p. 58.

* cited by examiner

*Primary Examiner*—Thomas R Hannon
*Assistant Examiner*—James Pilkington
(74) *Attorney, Agent, or Firm*—Antonelli, Terry, Stout & Kraus, LLP.

(57) ABSTRACT

A thrust bearing device comprising a runner portion attached to a rotational axis and having a plane perpendicular to the axial direction of the rotational axis, and a fixed portion having a sliding surface facing the plane of the runner portion, wherein the fixed portion has a plurality of oil grooves extending in radial directions formed on the sliding surface, a plurality of tapered lands formed among some of the plurality of oil grooves on the sliding surface and having a tapered plane and a plane, a plurality of flat parts formed among the remainder of the plurality of oil grooves on the sliding surface and having only a plane, and a plurality of oil supply openings formed in each of the plurality flat parts and pressurized oil is externally supplied.

4 Claims, 3 Drawing Sheets

THRUST BEARING DEVICE

CLAIM OF PRIORITY

The present application claims priority from japanese application serial no. 2006-274241, filed on Oct. 5, 2006, the content of which is hereby incorporated by reference into this application.

BACKGROUND OF THE INVENTION

1. Field of the Invention

The present invention relates to a thrust bearing device used in rotating machines and, more particularly, to a thrust bearing device to which a thrust load is applied when the rotational axis is stopping.

2. Prior Art

If a thrust load is applied, for example, when the rotational axis is stopping, a static pressure type of thrust bearing is used which forms an oil film between the sliding surface of the rotational axis side and the sliding surface of the bearing side by supplying a high-pressure lubricant, and uses the static pressure of the oil film to support the thrust load. A contact between the sliding surface of the rotational axis side and the sliding surface of the bearing side is thus avoided, preventing the bearing from being damaged. As an example of this static pressure type of thrust bearing, an arrangement has been disclosed in which oil supply openings (pockets) formed on a pad sliding surface and oil supply holes communicating with the oil supply openings are provided with a tilting pad thrust bearing (see Patent Document 1, for example).

For small rotary machines, for example, tilting pad thrust bearings having a complex structure and thereby including many parts result in high costs, so tapered land thrust bearings having a simple structure and thereby reducing the number of parts are often used. In general, a tapered land thrust bearing has a plurality of oil grooves formed on the sliding surface on the bearing side, which extend in radial directions and lead a lubricant, and also includes a plurality of tapered lands, which comprises tapered parts (tilted planes) and lands (planes) formed among the plurality of grooves. The lubricant is led to the tapered lands through the oil grooves when, for example, the rotational axis is rotating at high speed. A flow along the periphery of the tapered lands generates a dynamic pressure. The dynamic pressure supports the thrust load. The ratio of the area of the lands to the area of the tapered lands is preferably set to about 20% (see Non-patent Document 1, for example).

Patent Document 1: Japanese Patent Publication No. 2006-274244.

Non-patent Document 1: Japanese Society of Tribologists, Toraiboroji hando bukku (tribology handbook), Yokendo, 2001, p. 58

SUMMARY OF THE INVENTION

The tapered land thrust bearing described above has a simpler structure than the tilting pad thrust bearing, so the number of parts in the tapered land thrust bearing can be reduced. However, when the tapered land thrust bearing is used in a case in which a thrust load is applied when, for example, the rotational axis is stopping, the sliding surface of the rotational axis side and the sliding surface of the bearing side are brought into contact with each other, which may damage the bearing. In a possible method to address this problem, pressurized oil is supplied to the lands of the tapered lands to form an oil film, and the static pressure of the oil film is used to support the thrust load. However, the ratio of the area of the lands to the area of the tapered lands is relatively as small as about 20%, so it is hard to obtain a sufficient lifting force acting according to the static pressure of the oil film. Accordingly, this method is problematic in that high reliability cannot be obtained.

An object of the present invention is to provide a highly reliable thrust bearing with a simple structure.

(1) To achieve the above object, the present invention, which is a thrust bearing device comprising a runner portion which is attached to the rotational axis and has a plane perpendicular to the axial direction, and a fixed portion having a sliding surface facing the plane of the runner portion; the fixed portion has a plurality of oil grooves, extending in radial directions, formed on the sliding surface, a plurality of tapered lands formed among some of the plurality of oil grooves on the sliding surface, each of the plurality of tapered lands comprising a tapered plane and a plane, a plurality of flat parts formed among the remainder of the plurality of oil grooves on the sliding surface, each of the plurality of flat parts comprising only a plane, and a plurality of oil supply openings to which pressurized oil is externally supplied, each of the plurality of oil supply openings being formed in each of the plurality flat parts.

According to the present invention, when, for example, the rotational axis is rotating at high speed, the surrounding lubricant is led to the tapered lands on the sliding surface of the fixed portion through the oil grooves, and a dynamic pressure caused by a flow along the periphery of the tapered lands supports the thrust load. When, for example, the rotational axis is stopping or rotating at low speed, pressurized oil is externally supplied to the flat parts on the sliding surface through the oil supply openings or the like so as to form an oil film; the static pressure of the oil film on the flat parts supports the thrust load. Since, in this invention, the sliding surface of the fixed portion has a plurality of tapered lands, each of which comprises a tapered plane and a plane, among some of a plurality of oil grooves and also includes a plurality of flat parts, each of which comprises only a plane, among the remainder of the plurality of oil grooves, the ratio of the planes on the sliding surface can be increased, as compared with, for example, a case in which tapered lands are formed among all of the plurality of oil grooves. A sufficient lifting force acting according to the static pressure of the oil film can be thus obtained. As a result, it can be prevented that the bearing is damaged when the rotational axis is stopping or rotating at low speed, improving the reliability. In addition, the structure is simple, as compared with, for example, the tilting pad thrust bearing, so the number of parts can be reduced. Accordingly, in the present invention, a highly reliable thrust bearing with a simple structure can be implemented.

(2) In (1) above, the rotational axis is preferably disposed so that the axis direction is horizontal; the sliding surface of the fixed portion is preferably formed in an annular shape; the plurality of flat parts are preferably disposed symmetrically with respect to at least either of the horizontal direction and the vertical direction.

(3) In (1) above, the rotational axis is preferably disposed so that the axis direction is horizontal; the sliding surface of the fixed portion is preferably formed in a partial annular shape so that the sliding surface is disposed above or below the axial centerline of the rotational axis; the plurality of flat parts are preferably disposed symmetrically with respect to the vertical direction.

(4) In (3) above, the fixed portion is preferably fixed to a side surface of a journal bearing in the axial direction that rotatably supports the rotational axis; the journal bearing preferably has a plurality of oil supply openings formed at low positions on the sliding surface so that the oils supply openings are symmetric with respect to the center of the axial width of the journal bearing, and is disposed so as to be swingably in the axial direction.

According to the present invention, a highly reliable thrust bearing with a simple structure can be implemented.

DETAILED DESCRIPTION OF THE INVENTION

The embodiments of the present invention will be described with reference to the drawings.

A first embodiment of the present invention will be described with reference to FIGS. 1 to 3.

Figure 1:
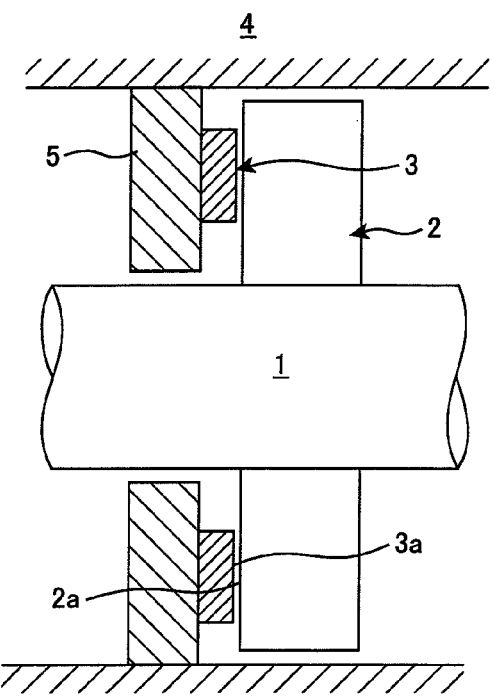
FIG. 1 is a cross sectional drawing in the axial direction of the thrust bearing to illustrate schematically the structure of a first embodiment of the present invention.

FIG. 1 is a cross sectional view in the axial direction, which schematically illustrates the structure of a thrust bearing device according to this embodiment of the present invention. FIG. 2 shows the structure of the sliding surface of a fixed portion in detail together with an oil supply system. FIG. 3 is a cross sectional view of section III-III in FIG. 2, which illustrates part of the fixed portion in the peripheral direction.

Figure 2:
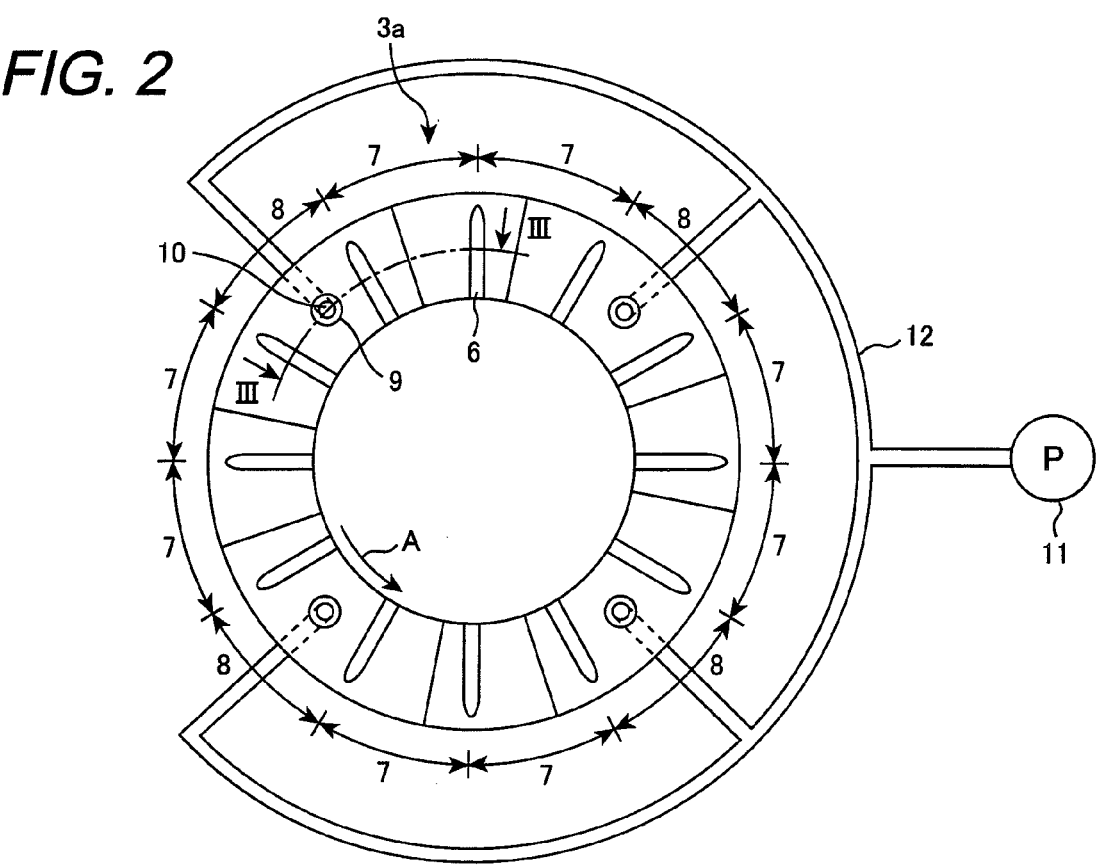
FIG. 2 is a detailed drawing to illustrate the structure of the sliding surface of the fixed portion, which is part of the thrust bearing of the first embodiment, together with an oil supply system.
Figure 3:
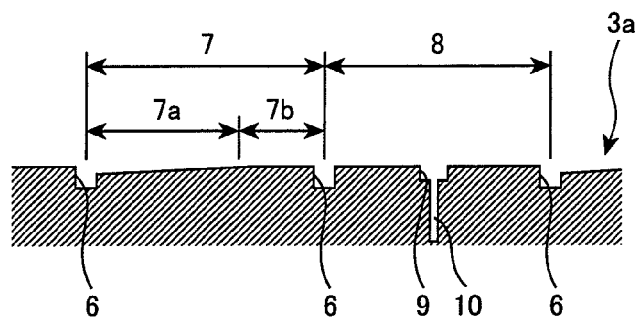
FIG. 3 is a cross sectional drawing of section III-III in FIG. 2 to illustrate part of the fixed portion in the peripheral direction.

In FIGS. 1 to 3, the thrust bearing in this embodiment is disposed so that the axial direction of the rotational axis 1 becomes horizontal (in the lateral direction in FIG. 1), and is attached to a rotary machine (not shown), having a horizontal axis, to which a thrust load is applied when the rotational axis 1 is stopping. The thrust bearing has a runner portion 2, for example, in an annular shape, which is attached to the rotational axis 1 and has a plane (sliding surface) 2a perpendicular to the axial direction, and also includes a fixed portion 3 that has a sliding surface 3a facing the plane 2a of the runner portion 2. The fixed portion 3 is fixed to a housing 4, which accommodates the rotational axis 1, through a bearing attaching member 5 (alternatively, the fixed portion 3 may be attached directly to the housing 4).

On the annular sliding surface 3a of the fixed portion 3, a plurality of oil grooves 6 (12 oil grooves 6, for example) extending in radial directions are formed at 30-degree intervals, from a top position in the vertical direction (a top position in FIG. 2). Among the oil grooves 6 on the sliding surface 3a, tapered lands 7, each of which comprises a tapered part (tapered plane) 7a and a land (plane) 7b, are formed at positions of 15, 75, 105, 165, 195, 255, 285, and 345 degrees in a direction A (the rotational direction of the rotational axis 1) in FIG. 2, starting from a top position in the vertical direction. The tapered part 7a of the tapered land 7 is tapered, for example, in the peripheral direction, and is contiguous to the land 7b with a boundary therebetween in a radial direction.

Among the oil grooves 6 on the sliding surface 3a, flat parts 8, each of which comprises only a plane, are formed at positions of 45, 135, 225, and 315 degrees in the direction A in FIG. 2, starting from the top position in the vertical direction. That is, the flat parts 8 are symmetrically disposed with respect to the vertical direction (the longitudinal direction in FIG. 2) and the horizontal direction (the lateral direction in FIG. 2). An oil supply opening (static pressure groove) 9 is formed approximately at the center of each of the flat parts 8. Oil supply holes 10, each of which communicates with the oil supply opening 9, are also formed. An oil supply system 12 is provided, which supplies pressurized oil from a hydraulic pump 11 to the oil supply holes 10.

Next, the operation and effect of this embodiment will be described.

When, for example, the rotational axis 1 is stopping or rotating at low speed, the hydraulic pump 11 is driven to supply pressurized oil to the flat parts 8 on the sliding surface 3a of the fixed portion 3 through the oil supply system 12, oil supply holes 10, and oil supply openings 9 so as to form an oil film; the static pressure of the oil film on the flat parts 8 supports the thrust load. When, for example, the rotational axis 1 is rotating at high speed, the hydraulic pump 11 is stopped, but the surrounding lubricant is led to the tapered lands 7 on the sliding surface 3a of the fixed portion 3 through the oil grooves 6. A dynamic pressure caused by a flow along the periphery of the tapered lands 7 supports the thrust load.

Among the 12 oil grooves 6 on the sliding surface 3a of the fixed portion 3 in this embodiment, the tapered lands 7 are formed at eight places, and the flat parts 8 are formed at the remaining four places. Accordingly, the ratio of the planes contributing the generation of a lifting force due to a static pressure can be increased to as high as about 33% on the sliding surface 3a, as compared with a case, for example, in which tapered lands are formed among all oil grooves; a sufficient lifting force, which acts according to the static pressure of the oil film, can be obtained at the runner portion 2. As a result, it can be prevented that the bearing is damaged when the rotational axis 1 is stopping or rotating at low speed, improving the reliability. In addition, the structure is simple, as compared with, for example, the tilting pad thrust bearing, so the number of parts can be reduced. Accordingly, in this embodiment, a highly reliable thrust bearing with a simple structure can be implemented.

Furthermore, in this embodiment, the ratio of the planes to the sliding surface 3a can be increased without the number of oil grooves 6 being reduced. That is, if, for example, the area of the tapered lands is increased by reducing the number of oil grooves so that the ratio of the land area is increased, the amount of lubricant led through the oil grooves is lessened during high-speed rotation of the rotational axis. A temperature rise then occurs, causing failure of the bearing or another problem. In contrast, the number of oil grooves 6 is not reduced in this embodiment, so the temperature rise can be suppressed and thus a bearing failure and other problems can be prevented.

When, for example, a device with a large mass, such as a generator rotor or turbine (not shown) is attached to the rotational axis 1, the rotational axis 1 is distorted, and thereby the plane 2a of the runner portion 2 may be slightly tapered relative to the vertical direction. Error in manufacturing or assembling may also slightly incline the sliding surface 3a of the fixed portion 3 relative to the vertical direction. Accordingly, the clearance between the plane 2a of the runner portion 2 and the sliding surface 3a of the fixed portion 3 is not uniform over the periphery, so an uneven contact is highly likely to occur. In this embodiment, the four flat parts 8 on the sliding surface 3a of the fixed portion 3 are disposed so that the flat parts are symmetric with respect to the vertical direction and horizontal direction. When the rotational axis 1 is stopping or rotating at low speed, therefore, the pressure of the supplied oil causes a lifting force symmetric with respect to the vertical direction and horizontal direction, achieving a lift with the plane 2a of the runner portion 2 being parallel to the sliding surface 3a of the fixed portion 3. Accordingly, an uneven contact can be prevented.

When, for example, an arrangement is made so that tapered lands are formed among all oil grooves on the sliding surface of the fixed portion and pressurized oil is supplied to the lands of the tapered lands, the number of oil supply openings and oil supply holes formed on the lands becomes larger the number of oil supply openings 9 and oil supply holes 10 formed on the flat parts 8 as in this embodiment. As the number of oil supply openings 9 and oil supply holes 10 increases in this way, the adjustment of pressure balance for preventing uneven contact becomes more difficult. In this embodiment, the number of oil supply openings 9 and oil supply holes 10 can be made relatively small, facilitating the adjustment of pressure balance.

The first embodiment has been described by using a rotary machine having a horizontal axis as an example of a target to which the inventive thrust bearing is attached, but the present invention is not limited to this rotary machine; the inventive thrust bearing may be attached to, for example, a rotary machine having a vertical axis. In this case, a plurality of flat parts formed on the sliding surface of the fixed portion are preferably disposed symmetrically with respect to points. In this arrangement as well, the same effect as described above can be obtained.

A second embodiment of the present invention will be described with reference to FIGS. 4 to 6. In this embodiment, a fixed portion in a partially annular shape is provided on a side surface of a journal bearing in the axial direction.

Figure 4:
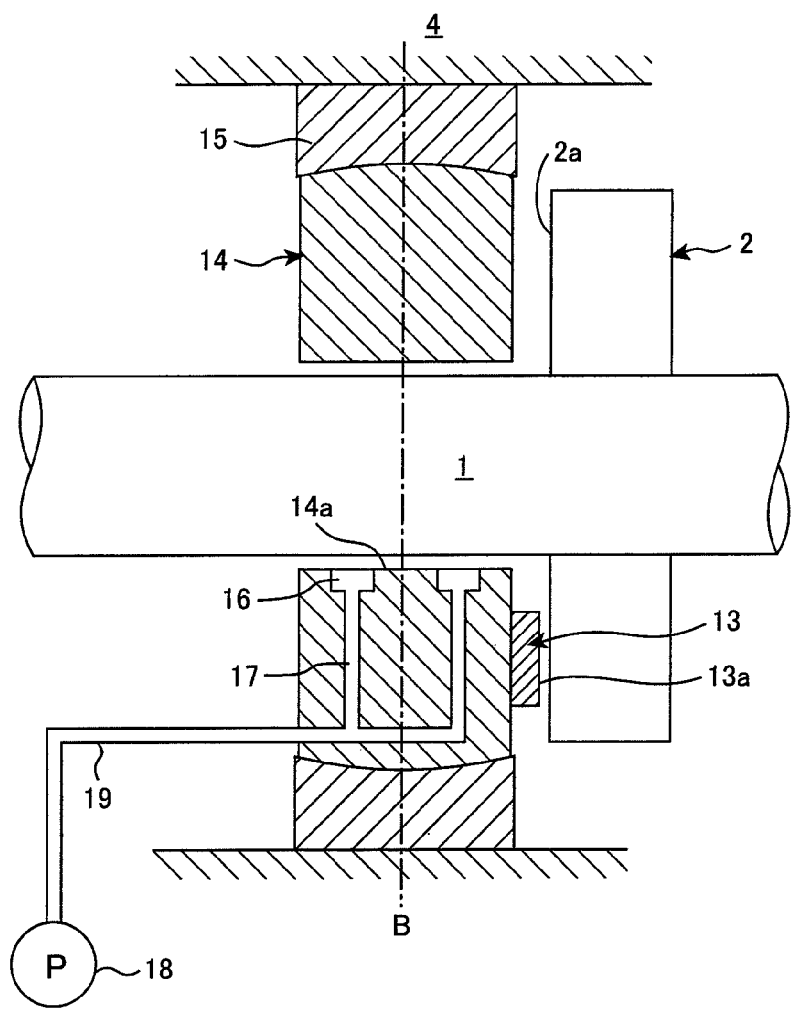
FIG. 4 is a cross sectional drawing in the axial direction of the thrust bearing to illustrate schematically the structure of the second embodiment of the present invention.
Figure 5:
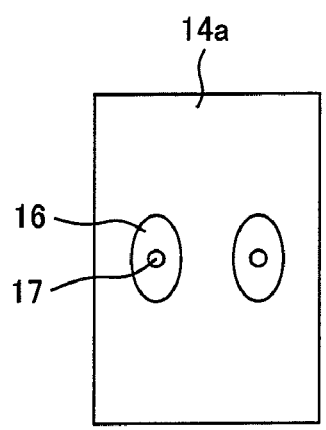
FIG. 5 is a detailed plan drawing to illustrate the structure below the sliding surface of a journal bearing in the thrust bearing of the second embodiment of the present invention.

FIG. 4 schematically shows the cross section of a thrust bearing according to this embodiment of the present invention in the axial direction. FIG. 5 is a plan view, which illustrates in detail the structure below the sliding surface of the journal bearing. FIG. 6 illustrates in detail the structure of the sliding surface of a fixed portion together with an oil supply system. In FIGS. 4 to 6, parts equivalent to parts in the first embodiment are assigned identical reference numerals and their explanation will be omitted.

The thrust bearing in this embodiment is disposed as in the first embodiment so that the axial direction of the rotational axis 1 becomes horizontal (in the lateral direction in FIG. 4), and attached to a rotary machine (not shown), having a horizontal axis, to which a thrust load is applied when the rotational axis 1 is stopping. The thrust bearing has a runner portion 2, for example, in an annular shape, which is attached to the rotational axis 1 and has a plane (sliding surface) 2a perpendicular to the axial direction, and also includes a fixed portion 13, for example, in a semi-annular shape, that has a sliding surface 13a facing the plane 2a of the runner portion 2. The fixed portion 13 is fixed to a side surface on one side (on the right side in FIG. 4) of the journal bearing 14 in the axial direction in such a way that the sliding surface 13a in the semi-annular shape is disposed below (at a low position in FIG. 4) the axial centerline of the rotational axis 1.

The journal bearing 14 is swingably attached to a bearing attaching member 15 in the axial direction. The journal bearing 14 has two oil supply openings (static pressure grooves) 16 and oil supply holes 17 communicating the oil supply openings 16, the two oil supply openings 16 being disposed at positions below a cylindrical sliding surface 14a and being symmetric with respect to a central line B of the width of the journal bearing 14 in the axial direction. Also provided is an oil supply system 19 for supplying pressurized oil from a hydraulic pump 18 to the oil supply holes 17. When, for example, the hydraulic pump 18 is driven to supply pressurized oil to the sliding surface 14a through the oil supply system 19, oil supply holes 17, and oil supply openings 16, the balanced pressures at the two oil supply openings 16 make the sliding surface 14a of the journal bearing 14 parallel to the axial direction of the rotational axis 1. Accordingly, since the sliding surface 13a of the fixed portion 13 is disposed so as to be orthogonal to the sliding surface 14a of the journal bearing 14, the clearance between the sliding surface 13a of the fixed portion 13 and the plane 2a of the runner portion 2 can be made more uniform over the vertical direction.

Figure 6:
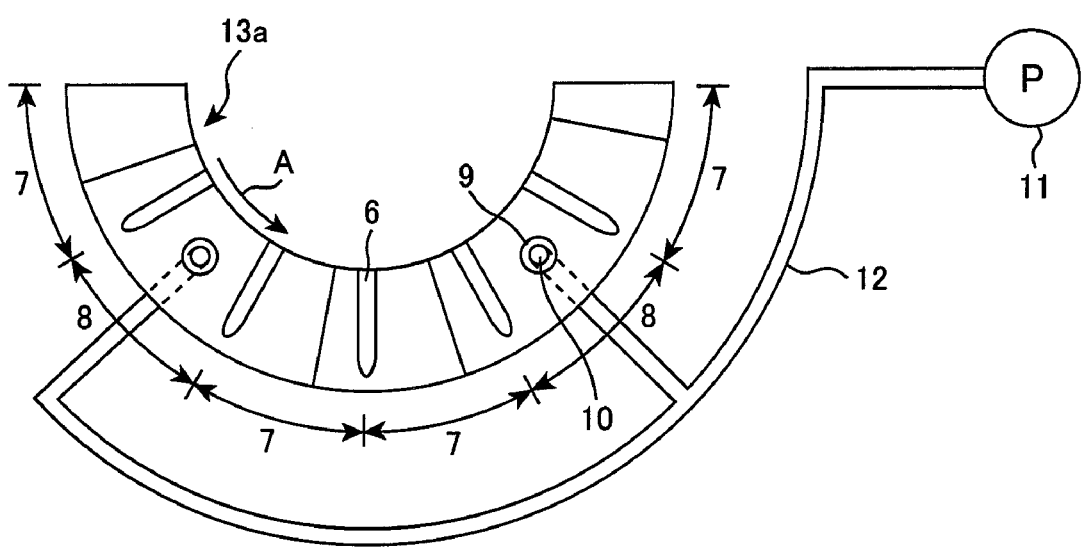
FIG. 6 is a detailed drawing to illustrate the structure of the sliding surface of the fixed portion, which is part of the thrust bearing according to the second embodiment.

On the sliding surface 13a of the fixed portion 13, a plurality of oil grooves 6 (five oil grooves 6, for example) extending in radial directions (strictly, reaching the inner peripheral surface and not reaching the outer peripheral surface) are formed at 30-degree intervals, from a position on one side (on the left side in FIG. 6) in the horizontal direction, as shown in FIG. 6. Among the oil grooves 6 on the sliding surface 13a, tapered lands 7, each of which comprises a tapered part 7a and a land 7b, are formed at positions of 15, 75, 105, and 165 degrees in a direction A (the rotational direction of the rotational axis 1) in the drawing, starting from the position one the one side in the horizontal direction.

Among the oil grooves 6 on the sliding surface 13a, flat parts 8, each of which comprises only a plane, are formed at positions of 45 and 135 degrees in the direction A in the drawing, starting from the position on the one side in the horizontal direction. That is, the flat parts 8 are symmetrically disposed with respect to the vertical direction (the vertical direction in FIG. 6) and approximately at the center of the fixed portion 13 in the vertical direction. An oil supply opening (static pressure groove) 9 is formed approximately at the center of each flat part 8. Oil supply holes 10, each of which communicates with the oil supply opening 9, are also formed. An oil supply system 12 is provided, which supplies pressurized oil from the hydraulic pump 11 to the oil supply holes 10.

In this embodiment structured as described above, the taper lands 7 are formed among four of the five oil grooves 6 on the sliding surface 13a of the fixed portion 13, and the flat parts 8 are formed among the remaining two. Accordingly, the ratio of the planes contributing the generation of a lifting force due to a static pressure can be increased to as high as about 33% on the sliding surface 13a, as compared with a case, for example, in which tapered lands are formed among all oil grooves; a sufficient force, which acts according to the static pressure of the oil film, can be obtained at the lands 7. In this embodiment as well, a highly reliable thrust bearing with a simple structure can thus be implemented as in the first embodiment.

In this embodiment, the two flat parts 8 on the sliding surface 13a of the fixed portion 13 are disposed so that the flat parts are symmetric with respect to the vertical direction. When the rotational axis 1 is stopping or rotating at low speed, therefore, the pressure of the supplied oil causes a lifting force symmetric with respect to the vertical direction, achieving a lift with the plane 2a of the runner portion 2 being parallel to the sliding surface 13a of the fixed portion 13 on a cross section in the horizontal direction. In addition, since the two flat parts 8 on the sliding surface 13a of the fixed portion 13 are disposed approximately at the center of the fixed portion 13 in the vertical direction, a desired lifting force can be caused over the vertical direction. Accordingly, an uneven contact can be prevented.

The second embodiment has been described by using an example in which the fixed portion 13 is fixed to a side surface on one side of the journal bearing 14 in the axial direction in such a way that the sliding surface 13a in the semi-annular shape is disposed below the axial centerline of the rotational axis 1, but the present invention is not limited to this arrangement. For example, the sliding surface of the fixed portion may be disposed above the centerline of the rotational axis 1, and the sliding surface of the fixed portion may be in another partially annular shape other than the semi-annular shape. In these arrangements as well, the same effect as described above can be obtained.

What is claimed is:

1. A thrust bearing device comprising a runner portion attached to a rotational axis and having a plane perpendicular to the axial direction of the rotational axis, and a fixed portion having a sliding surface facing the plane of the runner portion, wherein the fixed portion has a plurality of oil grooves extending in radial directions formed on the sliding surface, a plurality of tapered lands formed between some of the plurality of oil grooves on the sliding surface, the tapered lands having a tapered plane and a plane, a plurality of flat parts formed between the remainder of the plurality of oil grooves on the sliding surface and having only a plane, and a plurality of oil supply openings formed in each of the plurality of flat parts and pressurized oil is externally supplied.

2. The thrust bearing device according to claim 1, wherein the rotational axis is disposed so that the axis direction is horizontal; the sliding surface of the fixed portion is formed in an annular shape; the plurality of flat parts are disposed symmetrically with respect to at least either of the horizontal direction and the vertical direction.

3. The thrust bearing device according to claim 1, wherein the rotational axis is disposed so that the axis direction is horizontal; the sliding surface of the fixed portion is formed in a partial annular shape so that the sliding surface is disposed above or below the axial centerline of the rotational axis; the plurality of flat parts are disposed symmetrically with respect to the vertical direction.

4. The thrust bearing device according to claim 3, wherein the fixed portion is fixed to a side surface of a journal bearing in the axial direction for supporting the rotational axis rotatably; the journal bearing has a plurality of oil supply openings formed at positions below a cylindrical a sliding surface so that the oil supply openings are symmetric with respect to a central line of the width of the journal bearing in the axial direction, and the journal bearing is disposed so as to be swingable in the axial direction.

* * * * *